US012086963B2

United States Patent
Wiedmann

(10) Patent No.: US 12,086,963 B2
(45) Date of Patent: Sep. 10, 2024

(54) SYSTEM AND METHOD FOR DYNAMIC PHASE CORRECTION FOR X-RAY PHASE-CONTRAST IMAGING

(71) Applicant: GE PRECISION HEALTHCARE LLC, Wauwatosa, WI (US)

(72) Inventor: Uwe Wiedmann, Clifton Park, NY (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 285 days.

(21) Appl. No.: 17/677,569

(22) Filed: Feb. 22, 2022

(65) Prior Publication Data

US 2023/0267576 A1    Aug. 24, 2023

(51) Int. Cl.
 *G06T 5/70* (2024.01)
 *G06T 5/73* (2024.01)
 *G06T 7/215* (2017.01)

(52) U.S. Cl.
 CPC ............ *G06T 5/73* (2024.01); *G06T 7/215* (2017.01); *G06T 2207/10116* (2013.01)

(58) Field of Classification Search
 CPC . G06T 2007/10116–10128; G06T 5/70; G06T 7/20–285; G06T 7/10116–10128
 See application file for complete search history.

(56) References Cited

U.S. PATENT DOCUMENTS

| | | | | |
|---|---|---|---|---|
| 10,667,774 | B2 * | 6/2020 | Kato | A61B 6/4233 |
| 2004/0264627 | A1 * | 12/2004 | Besson | A61B 6/4241 378/5 |
| 2014/0003572 | A1 * | 1/2014 | Gregerson | A61B 6/56 378/4 |
| 2016/0095560 | A1 * | 4/2016 | Nakai | A61B 6/03 378/5 |
| 2016/0139392 | A1 * | 5/2016 | Yamaguchi | G02B 21/0084 359/393 |
| 2017/0262989 | A1 * | 9/2017 | Nempont | A61B 6/504 |
| 2019/0239839 | A1 * | 8/2019 | Rowley Grant | A61B 6/544 |
| 2020/0410666 | A1 * | 12/2020 | Wagner | G06N 3/08 |

(Continued)

OTHER PUBLICATIONS

Zamir, Anna, et al.; "Robust phase retrieval for high resolution edge illumination x-ray phase-contrast computed tomography in non-ideal environments", Scientific Report 2016; pp. 1-9.

(Continued)

*Primary Examiner* — Sean T Motsinger
(74) *Attorney, Agent, or Firm* — Fletcher Yoder P.C.

(57) ABSTRACT

A computer-implemented method for performing dynamic phase correction includes obtaining, at a processor, phase-contrast image data acquired by a photon-counting detector, wherein the photon-counting detector includes a plurality of subareas and each subarea includes a plurality of pixels configured to generate a measurable parameter in response to X-ray photons. The method also includes detecting, via the processor, motion within the phase-contrast image data within a sampling window for multiple subareas of the plurality of subareas. The method further includes estimating, via the processor, motion-correcting parameters for the detected motion within at least one subarea of the multiple subareas. The method still further includes generating, via the processor, a motion-corrected image based on the estimated motion-correcting parameters.

18 Claims, 5 Drawing Sheets

(56) References Cited

U.S. PATENT DOCUMENTS

| | | | | |
|---|---|---|---|---|
| 2021/0093265 A1* | 4/2021 | Decker | .................. | A61B 6/563 |
| 2021/0172885 A1* | 6/2021 | Sano | .................... | G01N 23/041 |
| 2021/0244373 A1* | 8/2021 | Wiedmann | ........... | A61B 6/4233 |
| 2022/0414844 A1* | 12/2022 | Koehler | .................... | G06T 5/50 |
| 2023/0011644 A1* | 1/2023 | Zhao | .................... | A61B 6/5282 |
| 2023/0040811 A1* | 2/2023 | Shibata | ................... | H01J 37/28 |
| 2023/0222658 A1* | 7/2023 | Yaroshenko | .............. | G06T 7/11 |
| | | | | 378/62 |
| 2023/0267576 A1* | 8/2023 | Wiedmann | .............. | G06T 7/215 |
| | | | | 382/255 |

OTHER PUBLICATIONS

Modregger, Peter, et al.; "Improved iterative tomographic reconstruction for x-ray imaging with edge-illumination", Phys. Med. Biol. 64, 2019, 205008; pp. 1-9.

Viermetz, Manuel, et al.; "Dark-field computed tomography reaches the human scale", PNAS 2022 vol. 119, No. 8, pp. 1-8.

* cited by examiner

SYSTEM AND METHOD FOR DYNAMIC PHASE CORRECTION FOR X-RAY PHASE-CONTRAST IMAGING

BACKGROUND

The subject matter disclosed herein relates to X-ray imaging and, more particularly, to phase-contrast imaging techniques.

Non-invasive imaging technologies allow images of the internal structures or features of a patient to be obtained without performing an invasive procedure on the patient. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient.

By way of example, in the context of X-ray absorption imaging techniques, X-rays are generated by an X-ray source and pass through an object or patient to reach a radiation detector. The X-rays are differentially absorbed as they pass through the object or patient based on the composition of the materials in the beam path. This differential X-ray absorption allows an image to be generated using the detected X-rays that provides information about internal structures of the object or patient. Such an image, which may be considered a conventional X-ray image, is useful for conveying information about materials that strongly absorb X-rays (i.e., high atomic weight or high-Z materials) such as bone, which exhibit high contrast with less absorptive materials. However, such X-ray absorption-based imaging approaches are less useful in generating information not related to the location of such high-Z materials. To address this deficiency, other imaging techniques may be employed. One such technique that also employs X-rays is phase-contrast imaging, which can yield information not available with conventional absorption X-ray imaging. In phase-contrast imaging, a series of gratings or a coherent source used in combination with fewer gratings can be employed to impart phase and interference properties to an X-ray beam. The resulting X-ray beam, when detected, yields additional information, particularly with respect to low atomic weight structures in the beam path as well as microstructures.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a computer-implemented method for performing dynamic phase correction is provided. The method includes obtaining, at a processor, phase-contrast image data acquired by a photon-counting detector, wherein the photon-counting detector includes a plurality of subareas and each subarea includes a plurality of pixels configured to generate a measurable parameter in response to X-ray photons. The method also includes detecting, via the processor, motion within the phase-contrast image data within a sampling window for multiple subareas of the plurality of subareas. The method further includes estimating, via the processor, motion-correcting parameters for the detected motion within at least one subarea of the multiple subareas. The method still further includes generating, via the processor, a motion-corrected image based on the estimated motion-correcting parameters.

In another embodiment, a processor-based system for performing dynamic phase correction is provided. The system includes a memory encoding one or more processor-executable routines, wherein the routines, when executed cause acts to be performed. The acts include obtaining phase-contrast image data acquired by a photon-counting detector, wherein the photon-counting detector includes a plurality of subareas and each subarea includes a plurality of pixels configured to generate a measurable parameter in response to X-ray photons. The acts also include detecting motion within the phase-contrast image data within a sampling window for multiple subareas of the plurality of subareas. The acts further include estimating motion-correcting parameters for the detected motion within at least one subarea of the multiple subareas. The acts still further include generating a motion-corrected image based on the estimated motion-correcting parameters. The system also includes a processor configured to access and execute the one or more routines encoded by the memory.

In a further embodiment, one or more non-transitory computer-readable media encoding one or more processor-executable routines are provided. The one or more routines, when executed by a processor, cause acts to be performed. The acts include obtaining phase-contrast image data acquired by a photon-counting detector, wherein the photon-counting detector includes a plurality of subareas and each subarea includes a plurality of pixels configured to generate a measurable parameter in response to X-ray photons. The acts also include detecting motion within the phase-contrast image data within a sampling window for multiple subareas of the plurality of subareas. The acts further include estimating motion-correcting parameters for the detected motion within at least one subarea of the multiple subareas. The acts still further include generating a motion-corrected image based on the estimated motion-correcting parameters.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
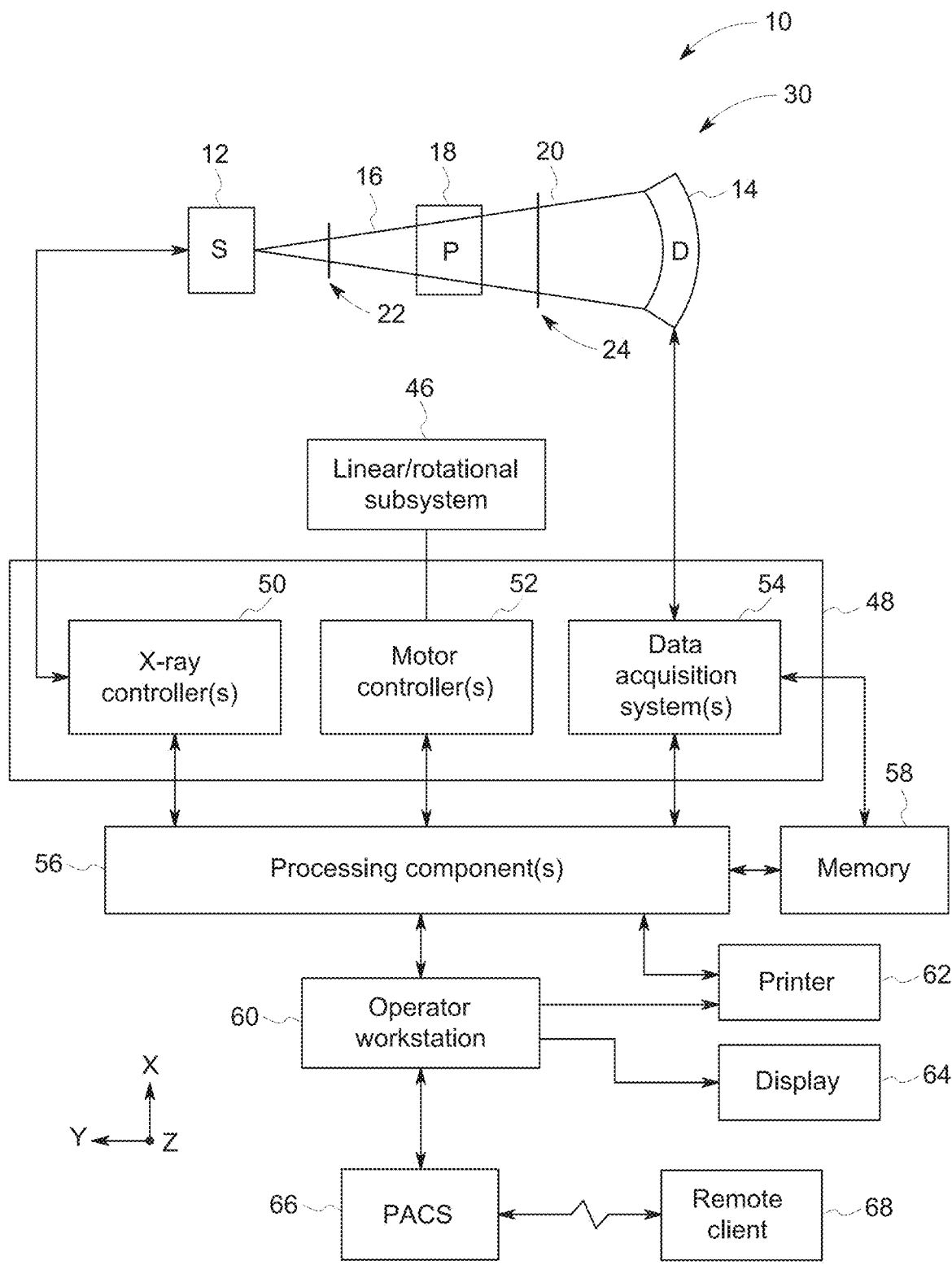
FIG. 1 is a diagrammatical view of an imaging system for use in producing images, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While aspects of the following discussion may be provided in the context of medical imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as tomographic image reconstruction for industrial Computed Tomography (CT) used in non-destructive inspection of manufactured parts or goods (i.e., quality control or quality review applications), and/or the non-invasive inspection of packages, boxes, luggage, and so forth (i.e., security or screening applications). In general, the present approaches may be useful in any imaging or screening context to improve phase contrast fringe detectability where a photon-counting detector is utilized and the geometry of the elements (e.g., X-ray source, detector, gratings, etc.) can change with respect to each other during a single view. For example, the present approaches may be applicable to full-body CT imaging, tomosynthesis, dedicated breast CT (e.g., small field of view (FOV) breast imaging), in vitro sample imaging, and non-destructive imaging (e.g., for quality control, homeland security, etc.). It should be noted that in non-destructive imaging, the image chain is often stationary and therefore more stable, but view durations can also be much longer (thus, enabling low-frequency vibrations and thermal motion to be more important with regard to changes in the geometry elements in the image chain).

Various forces may result in changes (e.g., deformations) in the geometry of the elements in the image chain with respect to each other during a single view. Deformations may occur due to g-forces (e.g., Earth's gravity or acceleration forces), vibrations, external forces (e.g., when a patient or operator contacts an imaging system), and/or thermal motion (however, in the context of medical imaging, thermal motion generally occurs on a time scale much longer than a view duration). In medical X-ray phase-contrast imaging, the interference pattern has a period in the order of approximately 10 micrometers (μm). This implies that vibrations of the X-ray source or any of the gratings with an amplitude of only a few micrometers can wash out the interference pattern. For example, in CT imaging systems with fast gantry speeds, it is common to have gantry deformation and vibration that largely exceeds this range. Therefore, for phase-contrast imaging in CT (or the other applications noted above), a dynamic correction of the phase is required for using the phase information.

The present disclosure provides techniques for eliminating or minimizing the effect of the deformations in the geometry of the elements in the image chain with respect to each other during a single view. In general, the disclosed embodiments enable motion correction of the imaging data by detecting motion within the phase-contrast image data during each view, estimating a set of motion-correcting parameters, and generating a motion-corrected image or calculating a set of parameters describing the motion-corrected image based on the estimated motion-corrected parameters. The motion correction may be applied within the detector (e.g., via processing circuitry) or close to the detector (e.g., during pre-processing by the circuitry (e.g., of the data acquisition system)) on the rotating side of the imaging system prior to data transmission to the stationary side of the imaging system. The disclosed embodiments enable correction for motion due to fast drift/vibration within a single view (e.g., sampling window).

With the preceding in mind, an example of an X-ray imaging system 10 suitable for acquiring data for reconstruction as discussed herein is provided in FIG. 1. As may be appreciated, the X-ray based imaging system 10 may be any suitable X-ray imaging modality where forces may result in changes (e.g., deformations) in the geometry of the elements in the image chain with respect to each other during a single view. Such imaging modalities may include a CT imaging system, a tomosynthesis imaging system, a mammography imaging system, and so forth.

In the embodiment illustrated in FIG. 1, imaging system 10 includes a source of X-ray radiation 12 and a detector 14. The X-ray source 12 may be an X-ray tube or comprise one or more other sources of X-ray radiation suitable for the acquisition of medical or other images. The X-rays 16 generated by the source 12 pass into an imaging region in which an object to be imaged (e.g., a part undergoing non-destructive evaluation or testing), a tissue sample to be imaged, a bag or package undergoing security screening, a patient undergoing an imaging protocol, and so forth may be positioned. In the illustrated example, a patient 18 undergoing imaging is positioned within the imaging volume during a procedure. In the depicted example, the X-rays 16 are collimated to be a fan-shaped (planar) or cone-shaped (volumetric) beam, e.g., a fan-beam or cone-beam, which passes through the imaged volume.

A portion of the X-ray radiation 20 passes through or around the patient 18 (or other subject of interest) and impacts a detector array, represented generally as the detector 14. Detector elements (e.g., pixels) of the detector 14 produce electrical signals that represent the intensity of the incident X-rays 20 upon detector elements of detector 14. These signals are acquired and processed, as discussed herein, to reconstruct images of the features within the patient 18.

With respect to the detector 14 as used herein, various types of detectors are contemplated that may be suitable for phase-contrast imaging in accordance with the present invention. In general, a detector 14 as used herein will comprise an array of pixels (e.g., electrodes). Each pixel is associated with some medium with which X-rays interact that measure some property or signal generated in response to the interaction of the X-rays with the medium.

In the context of a direct-conversion detector (i.e., a detector where there the X-ray photons are themselves detected and generate a responsive signal, such as via interaction with a semiconductor material, as opposed to a secondary photon generated by a scintillator). Such direct-conversion type detectors may be configured to provide certain additional functionality, such as photon-counting type detectors. In photon-counting contexts, the coincidence detection and/or spectral information may also be acquired using the detector 14. The techniques described below are for utilization with photon-counting detectors. In certain embodiments, the techniques described below may be utilized where a scintillator is used to convert high-energy X-ray photons to lower energy optical photons that are detected, and pixels (e.g., photodiode structure) are suitable for reading out signals generated in response to the optical photons.

In the depicted example gratings 22, 24 (e.g., absorption or phase gratings) are positioned in the path of the X-ray beam. The grating 22 or 24 may be the only grating provided if the source 12 is sufficiently small and/or is coherent. The grating 24 may be either in front of (grating 82 in FIG. 2) or behind (grating 24 in FIG. 1) the patient 18. In practice however, an additional source-side grating may be present near the source 12 to effectively cause a larger and/or incoherent source 12 to be perceived as a multitude of spatially-coherent line sources in a phase-contrast context. Such gratings may be present to facilitate phase-contrast imaging. In the depicted example, the grating 24 opposite the patient 18 relative to the source 12 (i.e., on the detector-side) is also provided.

In the present example, the source 12 and detector 14 (as well as any gratings, filters, collimators, and so forth) may be a part of an imager subsystem 30. In certain imaging modalities (e.g., CT), the source 12 and detector 14 of the imager 30 may be moved relative to the patient or imaged object along one or more axes during a scan procedure for which projection data is acquired. For example, the imager 30 may move about a first axis of rotation, a second axis of rotation, or a third axis of rotation, or any combination thereof. In one embodiment, the translation and rotation of the imager 30 may be determined or coordinated in accordance with a specified protocol. Alternatively, the imager 30 may be held constant, while the object is repositioned, such as in non-destructive testing applications.

The movement of the imager 30, if any, may be initiated and/or controlled by one or more linear/rotational subsystems 46. The linear/rotational subsystems 46 may include support structures, motors, gears, bearings, and the like, that enable the relative rotational and/or translational movement of the imager 30. In one embodiment, the linear/rotational subsystems 46 may include a structural apparatus (e.g., rotating gantry, turntable, and so forth) supporting the source 12 and the detector 14 or, alternatively, the object or patient 18.

A system controller 48 may govern the linear/rotational subsystems 46 that initiate and/or control the movement of the components of the imager 30. In practice, the system controller 48 may incorporate one or more processing devices that include or communicate with tangible, non-transitory, machine readable media collectively storing instructions executable by the one or more processors to facilitate performance of imaging operations. The system controller 48 may also include features that control the timing of the activation of the source 12, for example, to control the acquisition of X-ray data obtained during a particular imaging sequence. The system controller 48 may also execute various signal processing and filtration functions, such as for initial adjustment of dynamic ranges, interleaving of digital projection data, and so forth. Therefore, in general, the system controller 48 may be considered to command operation of the imaging system 10 to execute examination protocols. It should be noted that, to facilitate discussion, reference is made below to the system controller 48 as being the unit that controls acquisitions, movements, and so forth, using the imager 30. However, embodiments where the system controller 48 acts in conjunction with other control devices (e.g., other control circuitry local to the imagers or remote to the system 10) are also encompassed by the present disclosure.

In the present context, the system controller 48 includes signal processing circuitry and various other circuitry that enables the system controller 48 to control the operation of the imager 30 and the linear/rotational subsystems 46. In the illustrated embodiment, the circuitry may include an X-ray controller 50 configured to operate the X-ray source 12. Circuitry of the system controller 48 may also include one or more motor controllers 52. The motor controllers 52 may control the activation of various components that are responsible for moving the source 12 and the detector 14. In other words, the motor controllers may implement a particular acquisition trajectory or motion for the relative motion of the components of the imager 30.

The system controller 48 is also illustrated as including one or more data acquisition systems (DAS) 54. Generally, the detector 14 may be coupled to the system controller 48, and more particularly to the DAS 54. The DAS 54 may receive data collected by readout electronics of the detector 14 and in certain embodiments may process the data (e.g., by converting analog to digital signals or to perform other filtering, transformations, or similar operations).

It should be noted that the tangible, non-transitory, machine-readable media and the processors that are configured to perform the instructions stored on this media that are present in the system 10 may be shared between the various components of the system controller 48 or other components of the system 10. For instance, as illustrated, the detector 14, the X-ray controller 50, the motor controller 52, and the DAS 54 may share one or more processing components 56 that are each specifically configured to cooperate with one or more memory devices 58 storing instructions that, when executed by the processing components 56, perform image acquisition and reconstruction techniques. Further, the processing components 56 and the memory components 58 may coordinate in order to perform various image reconstruction processes.

The system controller 48 and the various circuitry that it includes, as well as the processing and memory components 56, 58, may be accessed or otherwise controlled by an operator via an operator workstation 60. The operator workstation 60 may include any application-specific or general-purpose computer that may include one or more programs (for example one or more imaging programs) capable of enabling operator input for the techniques described herein. The operator workstation 60 may include various input devices such as a mouse, a keyboard, a trackball, or any other similar feature that enables the operator to interact with the computer. The operator workstation 60 may enable the operator to control various imaging parameters, for example, by adjusting certain instructions stored on the memory devices 58.

The operator workstation 60 may be communicatively coupled to a printer 62 for printing images, patient data, and the like. The operator workstation 60 may also be in communication with a display 64 that enables the operator to view various parameters in real time, to view images produced by the acquired data, and the like. The operator workstation 60 may also, in certain embodiments, be communicatively coupled to a picture archiving and communication system (PACS) 66. Such a system may enable the storage of patient data, patient images, image acquisition parameters, and the like. This stored information may be shared throughout the imaging facility and may also be shared with other facilities, for example, a remote client 68. The remote client 68 may include hospitals, doctors' offices, or any other similar client.

The disclosed techniques for performing dynamic phase correction for X-ray phase-contrast imaging data may be performed by processing circuitry of the detector 14. In certain embodiments, the disclosed techniques for performing dynamic phase correction for X-ray phase-contrast imaging data may be performed by processing circuitry outside of the detector 14 but close to the detector 14 (although in certain embodiments it can be further away from the detector 14). Performing the disclosed techniques close to the detector 14 avoids transmission of large amounts of data over a longer distance (or from the rotating side of a CT gantry to the stationary side of the CT gantry). While the algorithm described in this disclosure could work when implemented further away from the detector 14, the algorithm was specifically designed to only require "local" information (i.e., it requires information only from a subset of the detector area), so that it can easily be implemented in a "parallelized" way (i.e., calculations done separately and independently for different subareas of the detector 14), using the high data rate coming from the detector 14 as its input and outputting data at a much lower data rate for each subarea.

For example, processing circuitry of the DAS 54 may perform the disclosed techniques. For example, with respect to a CT imaging system, the disclosed techniques may be performed by in the rotating portion of the CT imaging system before data transmission to the stationary portion. Performing the dynamic phase correction in the detector 14 or close to the detector 14 eases the constraints on the data transmission chain due to the large flux present in medical imaging which makes it impractical to transmit the exact location, timestamp, and energy of each single detected X-ray photon to the data processor on the stationary side.

Figure 2:
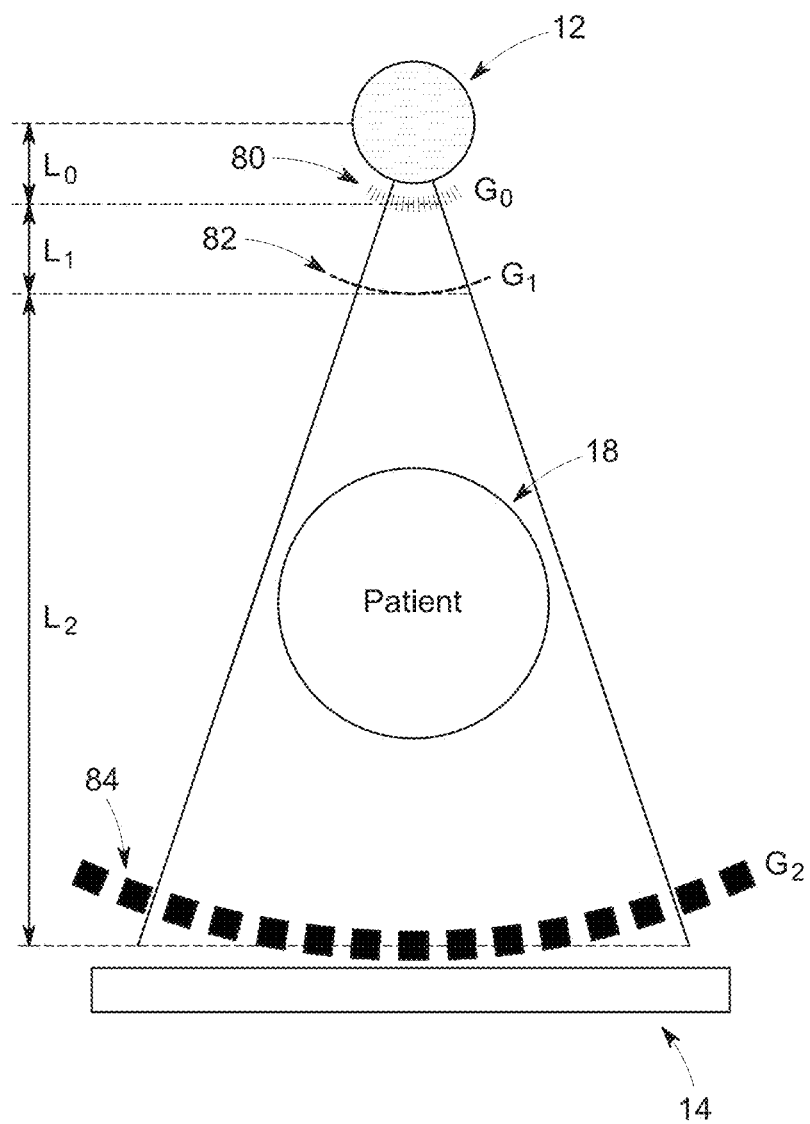
FIG. 2 depicts an example of a phase-contrast imaging system employing three gratings.

Various aspects of the present approaches may be further appreciated with respect to FIG. 2, which depicts features of a conventional phase-contrast imaging technique. Such phase-contrast imaging techniques typically determine a phase-shift angle for each voxel by comparing a spatial interference pattern observed with an object in the beam path with the spatial interference pattern when the object is absent. In the context of a phase-contrast CT imaging system, aspects of which are shown in FIG. 2, gratings (typically three gratings) may be employed to generate the interference patterns. In this example, a source-side grating G0 (denoted by reference number 80) is positioned near X-ray source 12 to ensure spatial coherence and effectively creates an array of individually coherent, but mutually incoherent emissions in response to operation of an incoherent X-ray source. A phase object in the beam path causes a slight refraction for each coherent subset of X-rays. The angular deviation so introduced results in changes of the locally transmitted intensity through the pair of gratings G1 and G2 (denoted by reference numbers 82 and 84 respectively), which can be detected by an X-ray detector 14 (as shown in FIG. 1). In particular, grating G1 82 in such an arrangement is located between the source 12 and detector 14 and imprints a periodic interference pattern onto the wave front. The grating G2 84 is located proximate to the detector (i.e., G2 is a detector-side grating) and resolves sub-pixel resolution interference pattern modulations. In practice, the gratings may be manufactured from silicon wafers using photolithography and electroplating where appropriate. It may be desirable for the G1 grating 82 to be close to the source 12 so as to obtain the best sensitivity possible (which is a function of distance L2 shown in FIG. 2). In certain embodiments, grating G2 84 may be absent in the system.

Figure 3:
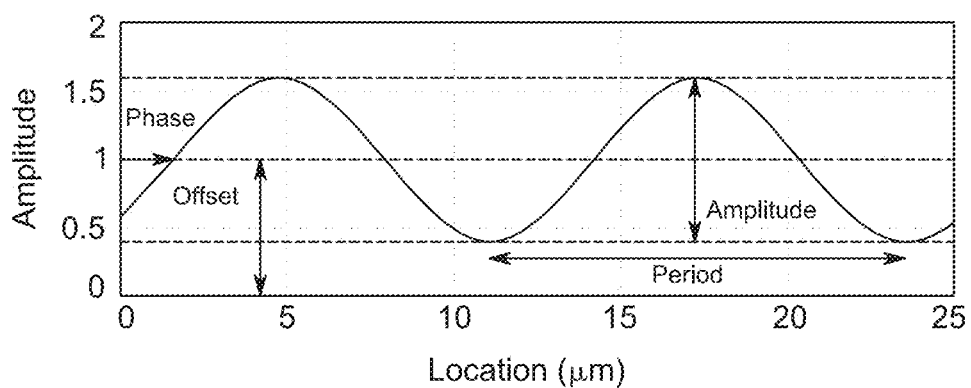
FIG. 3 depicts a generalized waveform illustrating parameters of a spatial interference pattern, in accordance with aspects of the present disclosure.

With respect to the spatial interference patterns (e.g., interference fringes) created in phase-contrast imaging, and turning to FIG. 3, a brief explanation may be helpful in understanding the following discussion. In particular, the interference pattern created in phase-contrast imaging has three parameters that may be measured (period being known by design): (1) offset; (2) phase; and (3) amplitude. Offset as used herein results from the overall attenuation, as in conventional X-ray imaging. Phase is the spatial shift of the interference pattern relative to a reference, which corresponds to a gradient of the real part of the aggregate refractive index seen by an X-ray passing through an object under test. Amplitude of the interference pattern is the difference between the peaks and the valleys of the pattern, which may be reduced in the presence of microstructure. These three parameters are illustrated in FIG. 3 in the context of a sample pattern or waveform.

Figure 4:
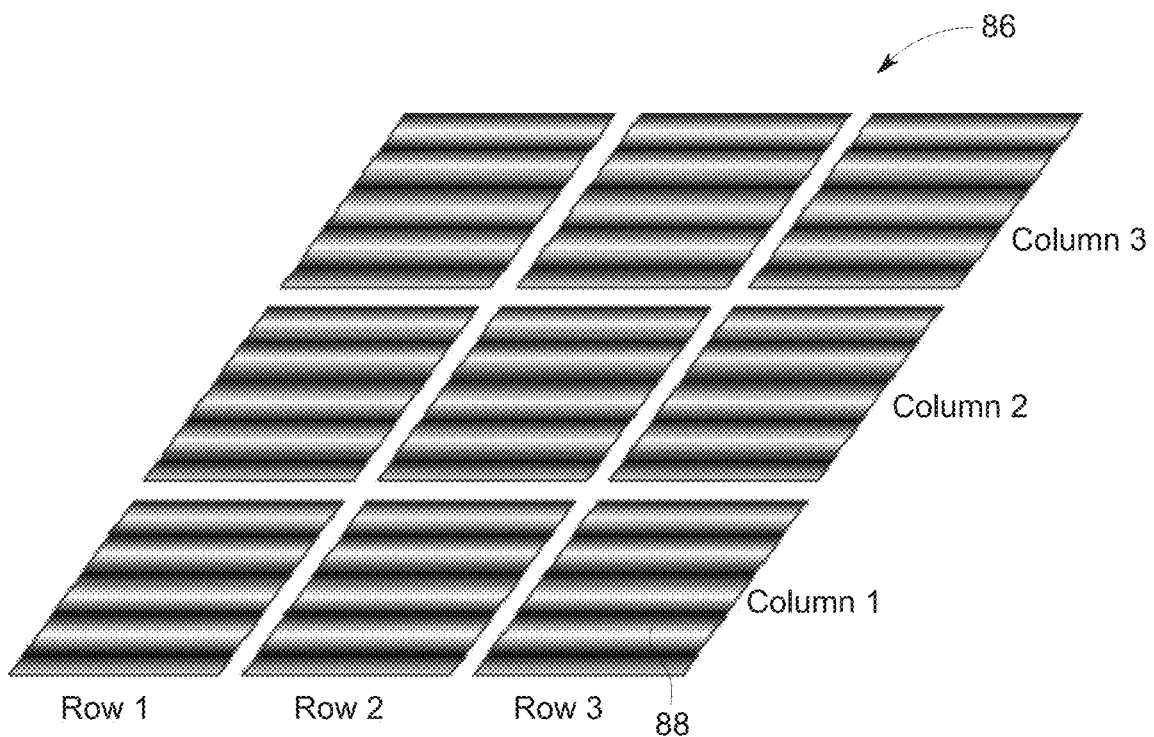
FIG. 4 is a schematic view of a detector area of a photon-counting detector, in accordance with aspects of the present disclosure.

FIG. 4 is a schematic view of a detector area 86 of the photon-counting detector 14 that may be utilized in improving phase contrast image detectability (e.g., enable dynamic phase correction) where the geometry of the elements in the image change (e.g., X-ray source, gratings, detector) change with respect to each other during a single view (e.g., sampling window or interval). For example in a CT system, during image data acquisition, a phase contrast pattern (e.g., interference pattern) is likely to shift due to vibration occurring on a rotating gantry with fast gantry speeds. To avoid signal wash out of the interference pattern, the shift needs to be compensated for. The photon-counting detector 14 provides both a time stamp and a location of each individual detected photon.

The detector area 86 in FIG. 4 depicts a portion of an entire detector area of the photon-counting detector 14. The detector area 86 includes a plurality of subareas 88. As depicted, the detector area 86 includes three rows (e.g., Row 1, Row 2, and Row 3) and three columns (e.g., Column 1, Column 2, and Column 3) of subareas 88. Each subarea 88 includes a plurality of pixels (e.g., electrodes) to detect X-ray photons. In a phase contrast system, a period and direction of the interference fringes or patterns is given by the system geometry, choice of the gratings, and the grating alignment. Both the period and direction of the interference fringes remain relatively stationary during a scan for each of the subareas 88, even under small deformation of the geometry. Given the quantum nature of the detection events, the detector area 86 needs to receive sufficient flux so that the presence of the interference fringes can be detected. This constraint defines a lower bound for the size of each subarea 88. The number of pixels in each subarea 88 (i.e., the size of the subarea 88) is large enough so that at least one period of interference fringes or patterns may be detected (e.g., 100 pixels) but small enough to be subjected to the essentially same geometric deformation (i.e., the interference fringes move in essentially the same manner, such as half a period to the right, for all pixels within that subarea). Each subarea 88 can detect a shift of the phase in interference pattern on a sub-view basis (e.g., sub-sample of the sampling window) or continuously. As described in greater detail below, correction (e.g., phase or motion correction) can be applied to each pixel within a given subarea 88 based on the average shifts (e.g., phase shifts) in the adjacent or neighboring subareas 88 and the given subarea 88. A neighboring subarea 88 for a given subarea 88 is any subarea 88 directly opposite (e.g., a side of the given subarea 88) and diagonally opposite (i.e., catty-cornered) the given subarea 88. For example, the center subarea 88 (e.g., on Row 2 and Column 2) of the detector area 86 has neighboring subareas 88 on all four sides and subareas 88 diagonally opposite all four corners. In certain embodiments, where a given subarea 88 is located along an edge or within a corner of the detector area 86, the given subarea 88 will have fewer neighboring subareas 88 (e.g., neighboring subareas 88 absent with respect to certain sides and/or corners).

Figure 5:
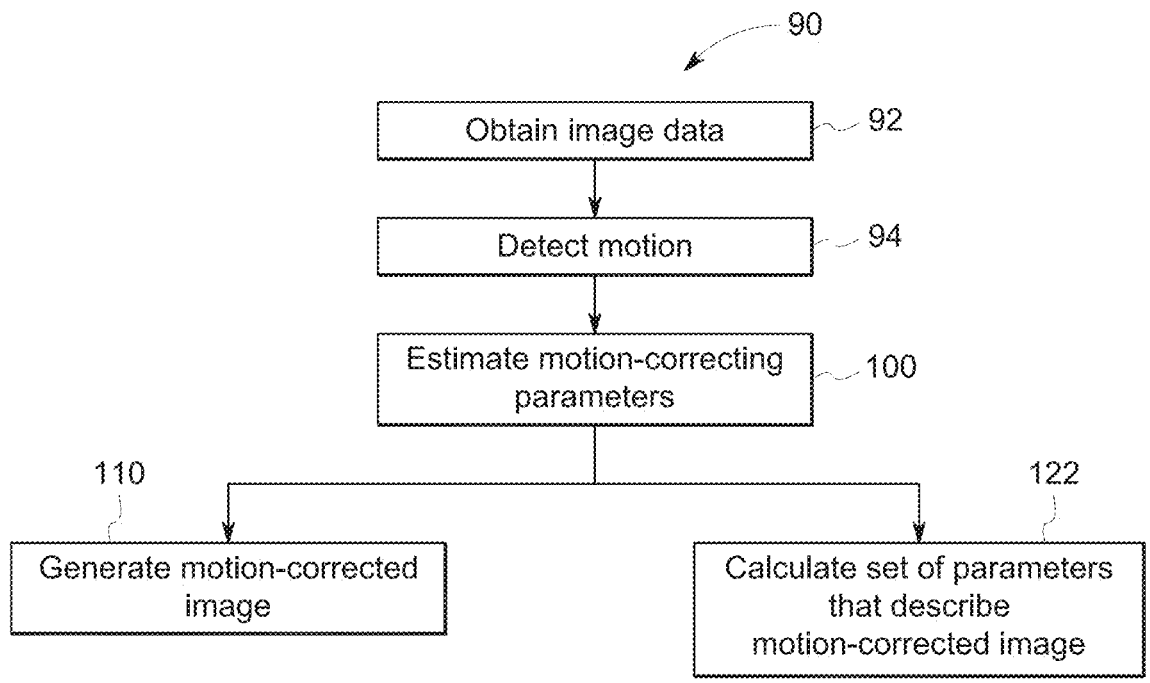
FIG. 5 is a flow chart of a method for performing dynamic phase correction on X-ray phase contrast imaging data, in accordance with aspects of the present disclosure.

FIG. 5 is a flow chart of an embodiment of a method 90 for performing dynamic phase correction on X-ray phase contrast imaging data. The method 90 be performed by processing circuitry of a detector (e.g., detector 14 in FIG. 1) or processing circuitry near the detector (e.g., processing circuitry of the DAS 54). The method 90 includes obtaining phase-contrast image data acquired by a photon-counting detector during a scan (block 92). The method 90 also includes detecting (and/or quantifying) motion within the obtained phase-contrast image data within a sampling window (e.g., DAS sampling window or a single view) for multiple subareas of a detector area (block 94). The multiple subareas may include some or all of the subareas of the detector area. A sampling window spans a given time period (e.g., 200 microseconds (μs)). Detecting motion within the obtained phase-contrast image data includes determining an average phase offset as a function of time (e.g., for an interference fringe) in each subarea of the multiple subareas. An interference fringe may have a period in the order of approximately 5 to 50 μm.

Figure 6:
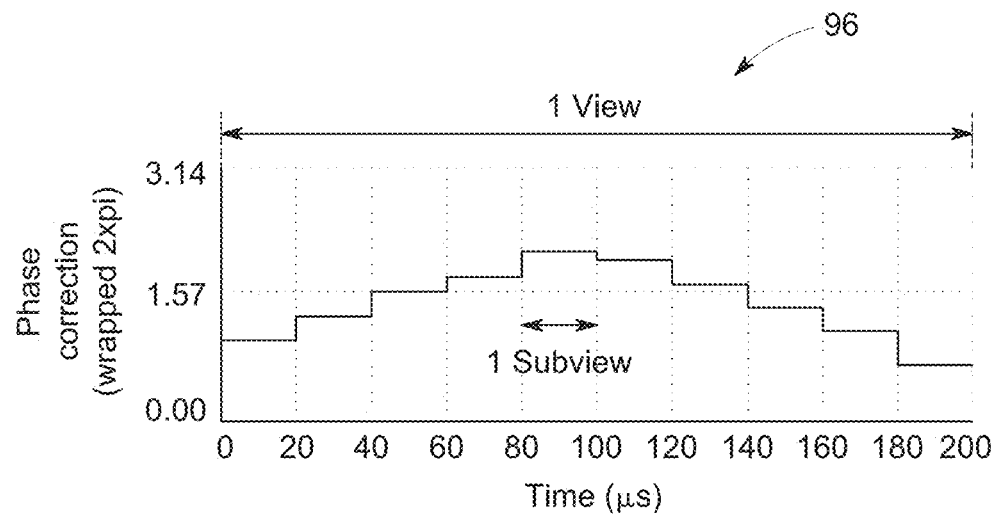
FIG. 6 is a graph illustrating a single view split into multiple subviews and the phase correction for each subview, in accordance with aspects of the present disclosure.

In certain embodiments, detecting motion within the obtained phase-contrast image includes oversampling the phase-contrast image data within the sampling window to obtain multiple subsamples (e.g., subviews). A subview or subsamples is shorter time period (e.g., 20 μs) within the sampling window. For example, a sampling window of 200 μs may be split into 10 subsamples of 20 μs. The time periods of a sampling window and subsamples may vary. For each subview or subsample, a phase is determined of the interference pattern or fringe. Areas that correspond to parts of fringes with the same expected phase are then evaluated to adjust phase offsets (e.g., phase correction) to maximize correlation (e.g., maximize an autocorrelation function) between the subviews or subsamples. FIG. 6 depicts a graph 96 illustrating a single view split into multiple subviews and the phase correction for each subview.

Figure 7:
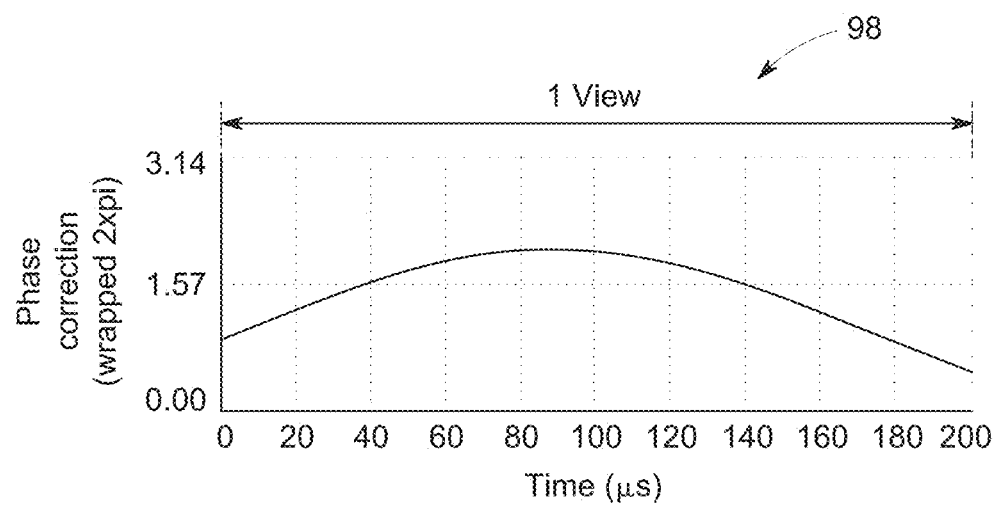
FIG. 7 is a graph illustrating phase correction over a single view utilizing a phase function, in accordance with aspects of the present disclosure.

In certain embodiments, detecting motion within the obtained phase-contrast image includes defining or determining a phase function during the sampling window or during multiple sampling windows. The phase function defines a regression with respect to a known function. A linear function, a quadratic function, and a trigonometric function are examples of the phase function. The coefficients of the phase function are then adjusted to maximize the fringe contrast. For example, joint parameter estimation may be utilized to adjust the coefficients. FIG. 7 depicts a graph 98 illustrating phase correction over a single view utilizing the phase function.

Returning to FIG. 5, the method 90 includes estimating motion-correcting parameters (i.e., the phase correction) for the detected motion (i.e., average determined phase offset) within each subarea of the multiple subareas (e.g., within the sampling window or single view) (block 100). Estimating motion-correcting parameters includes calculating a phase correction for each point in time for each pixel within each subarea of the multiple subareas based on the phase offsets as a function of time from the neighboring subareas of a given pixel in a given subarea. In particular, a single phase correction is calculated for each point in time for each subarea. For example, referring to FIG. 4, for a pixel in the center subarea (e.g., on Row 2 and Column 2), the phase correction or motion-correcting parameters are determined based on the average phase offset as a function of time in each neighboring subarea that is directly opposite a side of the center subarea and diagonally opposite a corner of the center subarea and the given subarea (e.g., center subarea) of the given pixel in the center subarea. In certain embodiments, each average phase offset as a function of time for the respective neighboring subareas may be weighted based on a distance of a center of the neighboring subarea to the given pixel that the phase correction is being determined for. For example, referring to FIG. 4, if the given pixel in the center subarea is located closer to a neighboring subarea on Row 2 and Column 1 than a neighboring subarea on Row 2 and Column 3, then more weight would be given to the average phase offset in the neighboring subarea on Row 2 and Column 1 than the average phase offset in the neighboring subarea on Row 2 and Column 3.

Figure 8:
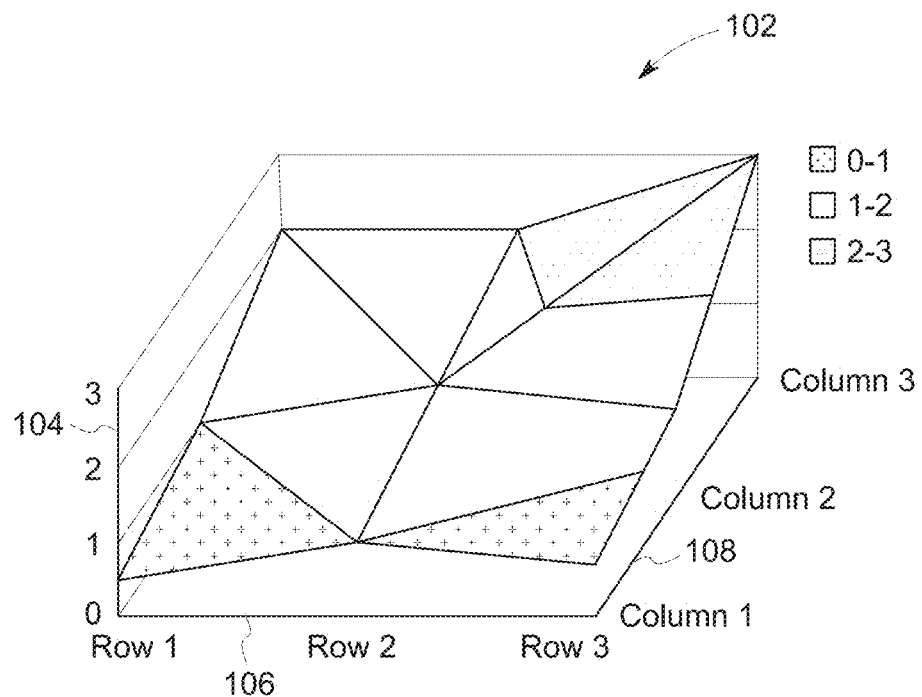
FIG. 8 is a graph illustrating phase correction for each pixel in a detector area, in accordance with aspects of the present disclosure.

FIG. 8 depicts a graph 102 illustrating phase correction for each pixel in the detector area 86 of FIG. 2. The y-axis 104 represents the phase correction, the x-axis 106 represents the row location, and the z-axis 108 represents the column location.

Figure 9:
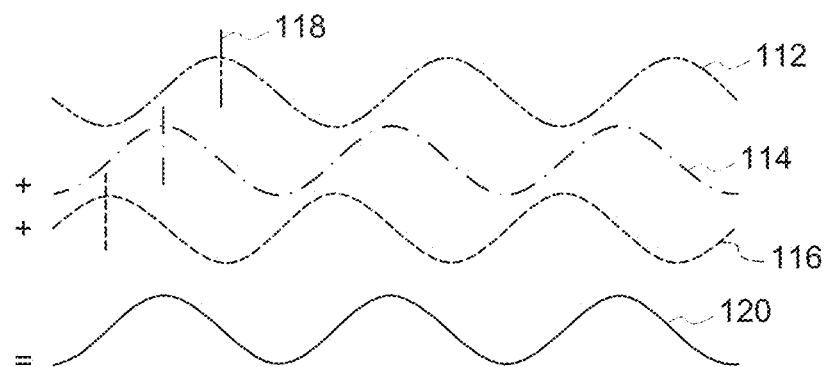
FIG. 9 is a schematic diagram illustrating alignment of signals via phase correction, in accordance with aspects of the present disclosure.

Returning to FIG. 5, the method 90 includes generating a motion-corrected image (e.g., for the sampling window or single view) based on the motion-correcting parameters (block 110). The motion-corrected image is obtained by shifting all the signals detected during the single view via dynamic phase correction and then summing the signals as depicted in FIG. 9. In FIG. 9, signals 112, 114, 116 represent signals detected during a single view. Lines 118 represent the location of the "zero phase" at different points in time of the signals 112, 114, 116. The signals 112, 114, and 116 are shifted or phase corrected so that these points 118 align. Once these points are aligned, the signals 112, 114, 116 may be summed to generate signal 120. Shifting all the signals detected during a single view via dynamic phase correction, prior to summing the signals, enables a full signal amplitude to be recovered (i.e., wash out does not occur). Returning to FIG. 5, alternatively, or in addition to, the method 90 includes calculating a set of parameters that describe the motion-corrected image (e.g., for the sampling window or single view) based on the motion-correcting parameters (block 122). These parameters may include static parameters such as the amplitude, phase and offset, as well as dynamic parameters describing the dynamic corrections applied.

Technical effects of the disclosed embodiments include providing techniques for dynamic phase correcting for fast drifts/vibrations within a single view. The ability to provide dynamic phase correction enables phase-contrast imaging to be utilized in imaging applications that experience changes (e.g., deformations) in the image chain (e.g., fast-rotating CT scanner). The techniques provide a software solution to provide the dynamic phase correction, thus, reducing mechanical design constraints. This may lead to significant cost reductions in a combined photon-counting and phase-contrast imaging system (e.g., CT scanner).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for performing dynamic phase correction, comprising:
   obtaining, at a processor, phase-contrast image data acquired by a photon-counting detector, wherein the photon-counting detector comprises a plurality of subareas, and each subarea comprises a plurality of pixels configured to generate a measurable parameter in response to X-ray photons;
   detecting, via the processor, motion within the phase-contrast image data within a sampling window for multiple subareas of the plurality of subareas, wherein detecting motion within the phase-contrast image data comprises determining an average phase offset as a function of time in each subarea of the multiple subareas;
   estimating, via the processor, motion-correcting parameters for the detected motion within at least one subarea of the multiple subareas; and
   generating, via the processor, a motion-corrected image based on the estimated motion-correcting parameters.

2. The computer-implemented method of claim 1, comprising calculating, via the processor, a set of parameters that describe the motion corrected image.

3. The computer-implemented method of claim 1, wherein detecting motion within the phase-contrast image data comprises:
   oversampling the phase-contrast image data within the sampling window to obtain a plurality of subsamples;
   for each subsample, determining a phase of an interference pattern; and
   for a same phase of the interference pattern, adjusting phase offsets to maximize correlation between the subsamples.

4. The computer-implemented method of claim 1, wherein detecting motion within the phase-contrast image data comprises:
   defining a phase function during the sampling window or during multiple sampling windows, wherein the phase function defines regression with respect to a known function; and
   adjusting coefficients of the phase function to maximize fringe contrast at an expected frequency.

5. The computer-implemented method of claim 1, wherein estimating motion-correcting parameters comprises calculating a phase correction for each point in time for each pixel within each subarea of the multiple subareas based on the average phase offsets as the function of time from neighboring subareas of a given pixel in a given subarea and the given subarea of the given pixel.

6. The computer-implemented method of claim 5, wherein each average phase offset as the function of time for a respective neighboring subarea is weighted based on a distance of the respective neighboring subarea to the given pixel in the given subarea.

7. The computer-implemented method of claim 1, wherein the processor is located within the photon-counting detector.

8. The computer-implemented method of claim 1, wherein the processor is located outside the photon-counting detector in a rotating portion of a computed tomography imaging system.

9. A processor-based system for performing dynamic phase correction, comprising:
   a memory encoding one or more processor-executable routines, wherein the routines, when executed cause acts to be performed comprising:
      obtaining phase-contrast image data acquired by a photon-counting detector, wherein the photon-counting detector comprises a plurality of subareas, and each subarea comprises a plurality of pixels configured to generate a measurable parameter in response to X-ray photons;
      detecting motion within the phase-contrast image data within a sampling window for multiple subareas of the plurality of subareas, wherein detecting motion within the phase-contrast image data comprises determining an average phase offset as a function of time in each subarea of the multiple subareas;
      estimating motion-correcting parameters for the detected motion within at least one subarea of the multiple subareas; and
      generating a motion-corrected image based on the estimated motion-correcting parameters; and
   a processor configured to access and execute the one or more routines encoded by the memory.

10. The system of claim 9, wherein the routines, when executed cause acts to be performed comprising calculating a set of parameters that describe the motion corrected image.

11. The system of claim 9, wherein detecting motion within the phase-contrast image data comprises:
   oversampling the phase-contrast image data within the sampling window to obtain a plurality of subsamples;

for each subsample, determining a phase of an interference pattern; and for a same phase of the interference pattern, adjusting phase offsets to maximize correlation between the subsamples.

12. The system of claim 9, wherein detecting motion within the phase-contrast image data comprises:

defining a phase function during the sampling window or during multiple sampling windows, wherein the phase function defines regression with respect to a known function; and adjusting coefficients of the phase function to maximize fringe contrast at an expected frequency.

13. The system of claim 9, wherein estimating motion-correcting parameters comprises calculating a phase correction for each point in time for each pixel within each subarea of the multiple subareas based on the average phase offsets as the function of time from neighboring subareas of a given pixel in a given subarea and the given subarea of the given pixel.

14. The system of claim 13, wherein each average phase offset as the function of time for a respective neighboring subarea is weighted based on a distance of the respective neighboring subarea to the given pixel in the given subarea.

15. The system of claim 9, wherein the processor-based system is part of a computed tomography imaging system.

16. The system of claim 9, wherein the processor-based system is located within the photon-counting detector.

17. The system of claim 10, wherein the processor-based system is located outside the photon-counting detector in a rotating portion of a computed tomography imaging system.

18. One or more non-transitory computer-readable media encoding one or more processor-executable routines, wherein the one or more routines, when executed by a processor, cause acts to be performed comprising:

obtaining phase-contrast image data acquired by a photon-counting detector, wherein the photon-counting detector comprises a plurality of subareas, and each subarea comprises a plurality of pixels configured to generate a measurable parameter in response to X-ray photons;

detecting motion within the phase-contrast image data within a sampling window for multiple subareas of the plurality of subareas, wherein detecting motion within the phase-contrast image data comprises determining an average phase offset as a function of time in each subarea of the multiple subareas;

estimating motion-correcting parameters for the detected motion within at least one subarea of the multiple subareas; and generating a motion-corrected image based on the estimated motion-correcting parameters.

* * * * *